(12) United States Patent
Lindinger et al.

(10) Patent No.: US 8,590,778 B2
(45) Date of Patent: Nov. 26, 2013

US008590778B2

(54) METHOD FOR OPERATING A TACHOGRAPH AND TACHOGRAPH

(75) Inventors: Andreas Lindinger, Flözlingen (DE); Winfried Rogenz, Villingen-Schwenningen (DE); Jan Schlüter, Villingen-Schwenningen (DE)

(73) Assignee: Continental Automotive GmbH, Hannover (DE)

( * ) Notice: Subject to any disclaimer, the term of this patent is extended or adjusted under 35 U.S.C. 154(b) by 634 days.

(21) Appl. No.: 12/671,812

(22) PCT Filed: Jun. 26, 2008

(86) PCT No.: PCT/EP2008/058179
§ 371 (c)(1), (2), (4) Date: Feb. 2, 2010

(87) PCT Pub. No.: WO2009/015952
PCT Pub. Date: Feb. 5, 2009

(65) Prior Publication Data

US 2011/0227970 A1 Sep. 22, 2011

(30) Foreign Application Priority Data

Aug. 2, 2007 (DE) ........................ 10 2007 036 589

(51) Int. Cl.
*G06F 17/30* (2006.01)

(52) U.S. Cl.
USPC ............................ 235/377; 235/376; 235/384

(58) Field of Classification Search
USPC ....................... 701/33, 35; 235/377, 376, 384
See application file for complete search history.

(56) References Cited

U.S. PATENT DOCUMENTS

| | | | |
|---|---|---|---|
| 5,305,214 | A | 4/1994 | Komatsu |
| 5,802,519 | A | 9/1998 | De Jong |
| 5,838,812 | A | 11/1998 | Pare, Jr. et al. |
| 2001/0005804 | A1 | 6/2001 | Rayner |
| 2002/0059075 | A1 | 5/2002 | Schick et al. |
| 2004/0027255 | A1 | 2/2004 | Greenbaum |

FOREIGN PATENT DOCUMENTS

| | | |
|---|---|---|
| DE | 4103724 | 8/1991 |
| DE | 10308972 | 7/2001 |
| DE | 103 08 972 A1 | 11/2003 |
| DE | 10260415 | 7/2004 |
| DE | 10200403942 | 3/2006 |
| EP | 1 118 965 A1 | 7/2001 |

(Continued)

OTHER PUBLICATIONS

Council Regulation (EEC) No. 3821/85 of Dec. 20, 1985 p. 1, cover sheet; pp. 25-64, Annex I B, pp. 167-185, Appendix 7.

*Primary Examiner* — Lam S Nguyen
(74) *Attorney, Agent, or Firm* — Cozen O'Connor

(57) ABSTRACT

Data obtained by a tachograph and stored in a memory of the tachograph in a first memory region in a predetermined first data format is processed according to a predetermined processing rule and is stored in a predetermined second data format, which differs from the predetermined first data format, in a second memory region. At least part of the data stored previously in the second memory region is read depending on an inquiry of an external reading unit in relation to the tachograph and is put out via a data interface of the tachograph while maintaining the predetermined second data format.

5 Claims, 4 Drawing Sheets

(56) References Cited

FOREIGN PATENT DOCUMENTS

| | | | |
|---|---|---|---|
| EP | 1118965 | | 7/2001 |
| EP | 1118965 | A1 | 7/2001 |
| EP | 1437690 | | 7/2004 |
| RU | 2 148 856 | C1 | 5/2000 |
| RU | 2 221 277 | C1 | 1/2004 |
| RU | 43 988 | U1 | 2/2005 |
| RU | 2 263 348 | C2 | 10/2005 |
| WO | WO 2007/031406 | * | 3/2007 |

* cited by examiner

| Idx | Tx | DAT | ST | GR |
|---|---|---|---|---|
| 0 | 1 | 01.01.1970 | 0 | 2 |
| 1 | 2 | 02.01.1970 | 2 | 2 |
| 2 | 3 | 03.01.1970 | 4 | 1 |
| 3 | 4 | 04.01.1970 | 5 | 3 |
| | ... | ... | ... | ... |
| 89 | 90 | 31.03.1970 | 16 | 1 |
| 90 | 91 | 01.04.1970 | 17 | 2 |
| 91 | 92 | 02.04.1970 | 19 | 1 |

| Idx | Tx | DAT | ST | GR |
|---|---|---|---|---|
| 0 | 93 | 03.04.1970 | 20 | 4 |
| 1 | 2 | 02.01.1970 | 2 | 2 |
| 2 | 3 | 03.01.1970 | 4 | 1 |
| 3 | 4 | 04.01.1970 | 5 | 3 |
| | ... | ... | ... | ... |
| 89 | 90 | 31.03.1970 | 16 | 1 |
| 90 | 91 | 01.04.1970 | 17 | 2 |
| 91 | 92 | 02.04.1970 | 19 | 1 |

METHOD FOR OPERATING A TACHOGRAPH AND TACHOGRAPH

PRIORITY CLAIM

This is a U.S. national stage of application No. PCT/EP2008/058179, filed on Jun. 26, 2008, which claims priority to the German Application No: 10 2007 036 589.8, Filed: Aug. 2, 2007; the content of both incorporated herein by reference.

BACKGROUND OF THE INVENTION

1. Field of the Invention

The invention relates to a method for operating a tachograph and a tachograph.

2. Prior Art

There are rules requiring data that has been acquired and stored by a digital tachograph to be downloaded from the tachograph and archived at predefined time intervals, for example approximately every three months. In addition, supervisory bodies carry out vehicle inspections in which the data that has been acquired and stored by the tachographs are also downloaded for inspection purposes. However, the conditioning of the data that has been recorded by the tachograph for the downloading is time-consuming. The downloading of the data can therefore take a long time.

SUMMARY OF THE INVENTION

An object of the invention is to provide a method for operating a tachograph and a tachograph which permits rapid outputting of data.

According to one embodiment of the invention acquired data stored in a first memory region in a predefined first data format is conditioned according to a predefined conditioning rule. The conditioned data is stored in a predefined second data format differs from the predefined first data format, in a second memory region. At least a portion of the data previously stored in the second memory region is read as a function of an inquiry by a reading unit which is external to the tachograph. At least one read portion of the data that has been previously stored in the second memory region is output via a data interface of the tachograph while preserving the predefined second data format.

The conditioning of the acquired data and storage of the conditioned data in the predefined second data format is carried out independently of the inquiry by the reading unit and is preferably already completely concluded at the time when the inquiry is made. As a result, the acquired data is already ready in the predefined second data format which is necessary for the outputting, and said data can therefore be output particularly quickly if the data is retrieved by the inquiry. The outputting can be carried out without a delay which would otherwise arise due to the conditioning of the acquired data, and for the outputting in the second data format.

In one embodiment of the invention, the conditioning of the acquired data in accordance with the predefined conditioning rule comprises the determination of at least one cryptographic check value as a function of the acquired data. The advantage is that the data which have been stored in the predefined second data format can therefore be protected against unauthorized manipulation. In addition, the determination of the at least one cryptographic check value even before the time when the inquiry is made makes it possible to save considerable time with respect to the outputting of the data.

Preferably the cryptographic check value is determined as a signature. The advantage is that the data is particularly well protected against unauthorized manipulation, and a particularly high security level is possible.

In a further embodiment, the second memory region is operated as a first circular buffer. This has the advantage that the most up-to-date data are always conditioned and stored in the predefined second data format available for rapid outputting.

In a further embodiment, checking for a change of day is performed. In addition, the conditioning of the acquired data for a respectively preceding day and the storage in the predefined second data format are carried out in the second memory region after the change of day has been detected. The advantage is that as a result the data for the respectively concluded day are available for retrieval in the predefined second data format. Data can therefore be read and output quickly. As a result, the data in the second memory region is up-to-date. In addition, the conditioning and storage of the acquired data for just one day respectively requires only a short amount of time. The conditioning and the storage in the predefined second data format are preferably carried out with low priority and particularly preferably during rest times during which the capacity of the tachograph is not already taken up by the acquisition of data. This is generally done in the night hours after midnight, that is to say directly after the change of day.

BRIEF DESCRIPTION OF DRAWINGS

Exemplary embodiments of the invention are explained below with reference to the schematic drawings, in which.

Elements of identical design or function are provided with the same reference symbols in all the figures.

DETAILED DESCRIPTION OF THE PREFERRED EMBODIMENTS

Figure 1:
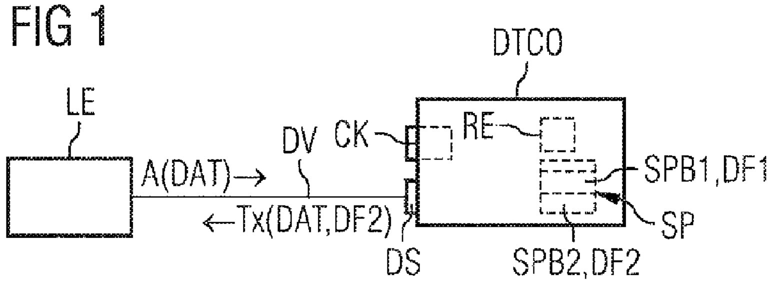
FIG. 1 is a tachograph and a reading unit.

A tachograph DTCO comprises a computing unit RE and a memory SP (FIG. 1). In addition, the tachograph DTCO has a chipcard-reading unit into which a chip card CK can be inserted. For example a company which uses the tachograph DTCO in one of its vehicles or has a driver who is currently driving the vehicle has such a chip card CK. However, a garage or an inspection body can also have the chip card CK. The access possibilities to data of the tachograph DTCO may vary as a function of the chip card CK. For example, garages and inspection bodies may be assigned unrestricted access rights. The access rights of companies to the data of the DTCO are, however, restricted, for example, to the data of the respective company, with the result that no access is possible to the data of different companies.

The access to the data of the tachograph DTCO stored in the memory SP, in particular to the data acquired by the tachograph DTCO, takes place via a reading unit LE which can be coupled via a data link DV to a data interface DS of the tachograph DTCO. The data link DV may be of cable-bound design or cableless design. The reading unit LE is arranged externally with respect to the tachograph DTCO.

The computing unit RE is provided for controlling functions of the tachograph DTCO. It is also possible to provide additional computing units for controlling functions of the tachograph DTCO. The functions of the tachograph DTCO comprise the acquisition of data, manipulation-proof storage of the acquired data and outputting of the acquired data as a function of an inquiry A by the reading unit LE. The acquired data comprises travel data a velocity, a change of the chip card CK, or other data acquired during the operation of the tachograph, for example fault messages.

The memory SP may comprise an individual memory unit or two or more individual memory units, for example memory chips. A first memory region SPB1 is provided in the memory SP. The tachograph DTCO is designed to store the data acquired by it in a predefined first data format DF1 in the first memory region SPB1. The predefined first data format DF1 is predefined by the manufacturer of the tachograph DTCO.

The data acquired by the tachograph DTCO and stored in the first memory region SPB1 must be downloaded and archived at predefined time intervals, approximately every three months. In addition, the downloading of data may also be necessary for vehicle inspections which are carried out by inspection bodies. For the downloading of the data, the reading unit LE is coupled to the tachograph DTCO. A transmission protocol which may be used for the transmission of the data is predefined, for example, by the EU Regulation (EEC) No. 3821/85 Appendix IB and Appendix 7. A maximum transmission rate of 115200 bits per second is therefore provided for the downloading. As a result, the transmission of the acquired data from approximately 90 days whose data records each have a size GR of on average approximately 1774 bytes, takes approximately 15.4 seconds. However, it is necessary for the acquired data stored in the first memory region SPB1 in the first data format DF1 to be conditioned for the transmission to the reading unit LE, for example filtered as a function of the company which is currently using the vehicle and the tachograph DTCO, the identity of which company is proven by its chip card CK. In addition, the reading unit LE requires, in accordance with the abovementioned EU Regulation, that the conditioned data are output in a predefined second data format DF2 by the tachograph DTCO and transmitted to the reading unit LE. The predefined second data format DF2 is preferably predefined by the abovementioned EU Regulation and differs from the predefined first data format DF1. However, it is also possible for the predefined second data format DF2 to be predefined by another Regulation or in some other way, for example in accordance with rules from other countries or groupings of countries which are not associated with the European Union.

The conditioning of the acquired data and the outputting of the conditioned data in the predefined second data format DF2 is time-consuming, with the result that the downloading of the acquired data can take several minutes in practice.

The tachograph DTCO is designed to condition in advance the data acquired and stored in the first memory region SPB1 in the predefined first data format DF1, that is to say to carry out conditioning before data from the tachograph DTCO are requested by the reading unit LE by the inquiry A, and to store the conditioned data in the predefined second data format DF2 in a second memory region SPB2 of the memory SP. If the reading unit LE makes an inquiry A to the tachograph DTCO, the data stored in the predefined second data format DF2 in the second memory region SPB2 can be output to the reading unit LE via the data interface DS of the tachograph DTCO while preserving the predefined second data format DF2 and without further conditioning or conversion. The outputting of the data can therefore take place at a high speed, and the downloading of the data can therefore be considerably sped up.

The first and second memory regions SPB1, SPB2 can be arranged in the same memory unit or in separate memory units of the memory SP. The first and second memory regions SPB1, SPB2 can each also respectively extend over two or more memory units. A storage capacity of the second memory region SPB2, and preferably also of the first memory region SPB1, is preferably dimensioned in such a way that the acquired data from at least 90 days can be stored simultaneously ready for retrieval given average data volume. For example, the storage capacity for the second memory region SPB2 is approximately 92 days at 1774 bytes per day, that is to say approximately 163208 bytes. However, the storage capacity can also be made smaller or larger.

Figure 2:
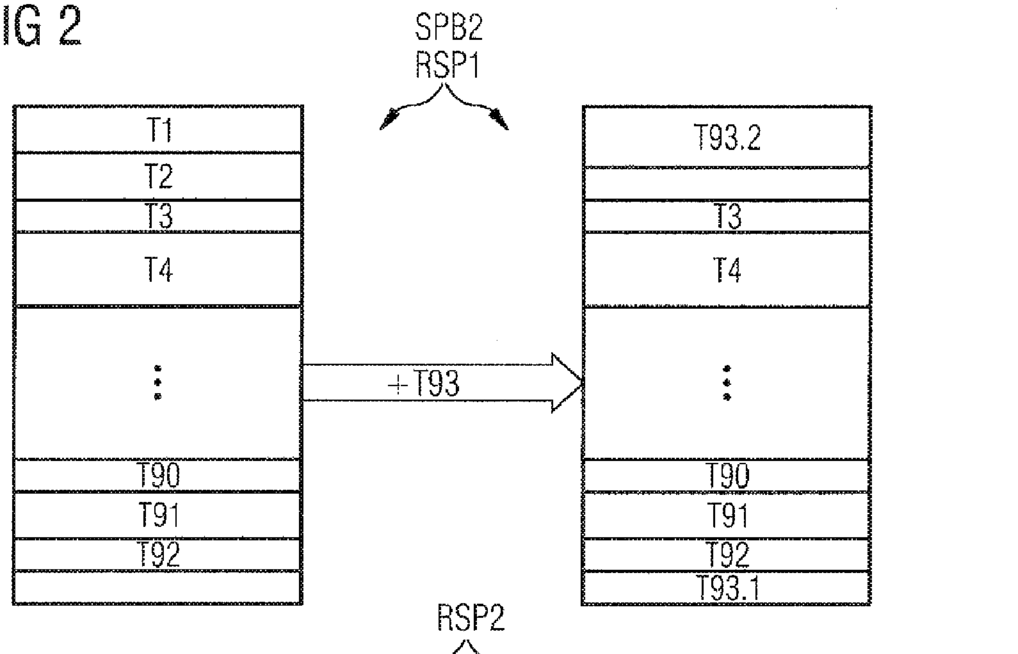
FIG. 2 is a first embodiment of a second memory region.

FIG. 2 shows a first embodiment of the second memory region SPB2. On the left-hand side in FIG. 2, the second memory region SPB2 is illustrated, and it comprises the data from a total of 92 days T1 to T92, which virtually completely fill the second memory region SPB2. The second memory region SPB2 is operated as a first circular buffer RSP1. In addition, a second circular buffer RSP2 in which in each case an access control structure ZS is stored for the data for every day Tx which are stored in the first circular buffer RSP1, that is to say for each data record, is assigned to the second memory region SPB2. The access control structures ZS which are stored in the second circular buffer RSP2 comprise a date DAT of the respective day Tx whose data are stored in the first circular buffer RSP1 in the second memory region SPB2. The respective access control structure ZS preferably also comprises a starting address ST which characterizes a start of the respectively associated data record in the second memory region SPB2, and preferably also comprises the size GR of the respectively associated data record. In addition, the respective access control structure ZS can also comprise an index Idx, which is assigned to the respectively associated data record in the second memory region SPB2, and/or a serial number of the respective day Tx.

The access control structures ZS which are stored in the second circular buffer RSP2 permit simple and rapid access to the data for the respective day Tx stored in the first circular buffer RSP1 in the second memory region SPB2.

The inquiry A which is made to the tachograph DTCO by the reading unit LE preferably comprises the date DAT of those days Tx whose data are to be output by the tachograph DTCO. The access control structures ZS stored in the second circular buffer RSP2 can very easily be searched through for the respective date DAT. Using the starting address ST stored in the associated access control structure ZS and, if appropriate, the size GR, the associated data stored in the first circular buffer RSP1 for the respectively interrogated day Tx can very easily be found and read.

In addition to the first circular buffer RSP1 and the second circular buffer RSP2, an oldest index AIdx and a latest index NIdx are stored in the memory SP. The oldest index AIdx corresponds to an indicator of that access control structure ZS which is assigned to the respectively oldest data record in the second memory region SPB2. The latest index NIdx corresponds to an indicator of that access control structure ZS which is assigned to the newest data record, that is to say the last to be stored, in the second memory region SPB2.

The latest index NIdx is updated when a new data record is stored in the second memory region SPB2. If the second memory region SPB2 is already so full that the data record which is to be newly stored can no longer be completely additionally stored in the second memory region SPB2, at least one old data record is overwritten, starting with the oldest data record. In this case, the oldest index AIdx is accordingly also updated, with the result that the latter indicates the access control structure ZS which is assigned to the current oldest data record in the second memory region SPB2.

This is shown by way of example on the right-hand side of FIG. 2. The data for a day T93 is stored in the virtually completely filled second memory region SPB2. However, the data for the day T93 is so extensive that the data for the days T1 and T2 have to be at least partially overwritten. A first portion of the data for the day T93 is stored at the end of the second memory region SPB2, adjacent to the data for the day T92. A second portion of the data for the day T93 is stored starting at the start of the second memory region SPB2. This second portion of the data for the day T93 extends over a region of the second memory region SPB2 which has previously been taken up by the data for the day T1, and over a portion of a region which has previously been taken up by the data for the day T2. In this example, the oldest index AIdx is updated such that the latter indicates the access control structure ZS of the data for the day T3. The data record for the day T3 is now the oldest data record the second memory region SPB2. In addition, the latest index NIdx is updated in such that the latter indicates the access control structure ZS of the data for the day T93. The data record for the day T93 is now the latest data record. In addition, the access control structure ZS for the day T1 is overwritten with the access control structure ZS for the day T93.

The second memory region SPB2 is preferably embodied as a first circular buffer RSP1 and the preferably second circular buffer RSP2 with the access control structures ZS is assigned to the first circular buffer RSP1 such that rapid and simple access to the data for the respective day Tx is possible. In addition, the data can be kept up to date very easily by respectively appending the newly arriving data to the data that has already been stored in the second memory region SPB2, and if necessary the data for the oldest day or the oldest days stored in the second memory region SPB2 can be overwritten. In particular, the data for the last three months can therefore be available in the second memory region SPB2 in a form that is up to date and ready to be retrieved.

Figure 3A:
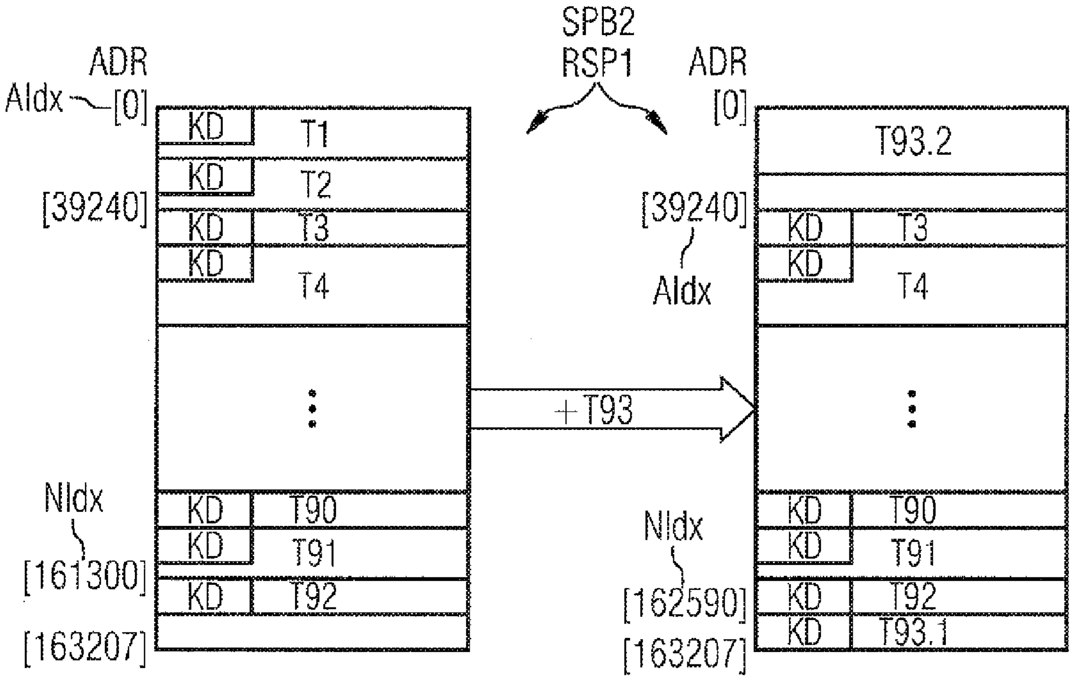
FIG. 3A is a second embodiment of the second memory region.

FIG. 3A is a second embodiment of the second memory region SPB2. According to the first embodiment (illustrated in FIG. 2) of the second memory region SPB2, the left-hand side of FIG. 3A exhibits a memory content of the second memory region SPB2 before the addition of the data for the day T93, and the right-hand side of FIG. 3A exhibits the memory content of the second memory region SPB2 after the addition of the data for the day T93. The second embodiment of the second memory region SPB2 differs from the first embodiment essentially in that each data record of the data records which is stored in the second memory region SPB2 respectively comprises check data KD, and the second circular buffer RSP2 is not necessary.

Figure 3B:
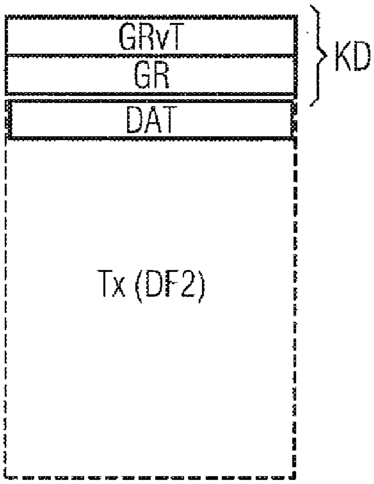
FIG. 3B is a data record.

A structure of a data record with check data KD is illustrated in FIG. 3B. The check data KD comprises the size GR of the respective data record. The check data KD preferably also comprise a size GRvT of the data for the respectively preceding day. In addition, the respective data record also comprises the associated date DAT. The data which have been stored in the second memory region SPB2 can be searched through very easily by means of the check data KD and the respective date DAT. The oldest index AIdx and the latest index NIdx are provided for characterizing the oldest data record or the latest data record in the second memory region SPB2. The oldest index AIdx and the latest index NIdx preferably each correspond to an address ADR of a start of the oldest or latest data record. The check data KD id preferably respectively arranged at the start of the respective data record, with the result that they can be accessed easily and quickly. Based on the oldest index AIdx or the latest index NIdx it is possible, while respectively taking into account the size GR of the respective data record or the size GRvT of the data for the respectively preceding day, to search through the second memory region SPB2 forwards or backwards by adding the size GR to the address ADR of the start of the respective data record or subtracting the size GRvT of the data for the preceding day and respectively outputting the date DAT and, if appropriate, the check data KD. In this way, the data associated with the searched-for date DAT can be found quickly and easily.

When data for the day Tx, in this example the data for the day T93, are added, the latest index NIdx is updated, and if appropriate, as is necessary in the case in this example, the oldest index AIdx is updated. In addition, the check data KD of the newly added data record for the day Tx is determined and stored.

It is also possible to provide for further information to be stored in the check data KD and correspondingly also in the access control structures ZS of the first embodiment, this being, for example, information as to which company, that is to say which chip card CK, the respective data record is assigned to. This makes it possible to store, and make available ready to be retrieved, in the second memory region SPB2, data records which are assigned to different companies, that is to say the data have been acquired with different chip cards CK. If one of the data records which have been stored in the second memory region SPB2 are interrogated by the inquiry A by the reading unit LE, it is very easily possible to determine on the basis of the information in the check data KD or the access control structures ZS relating to the company, whether the interrogated data are permitted to be output taking into account the currently inserted chip card CK. It is therefore very easy to ensure that each company can only access its own data, but cannot access the data of other companies.

Preferably only the data of that company whose chip card CK is currently inserted or was last inserted are conditioned, and stored in the predefined second data format DF2 in the second memory region SPB2. There is a very high probability that this data will be interrogated and downloaded. The data records which have been stored in the second memory region SPB2 preferably become invalid when the chip card CK of another company is inserted.

Figure 4:
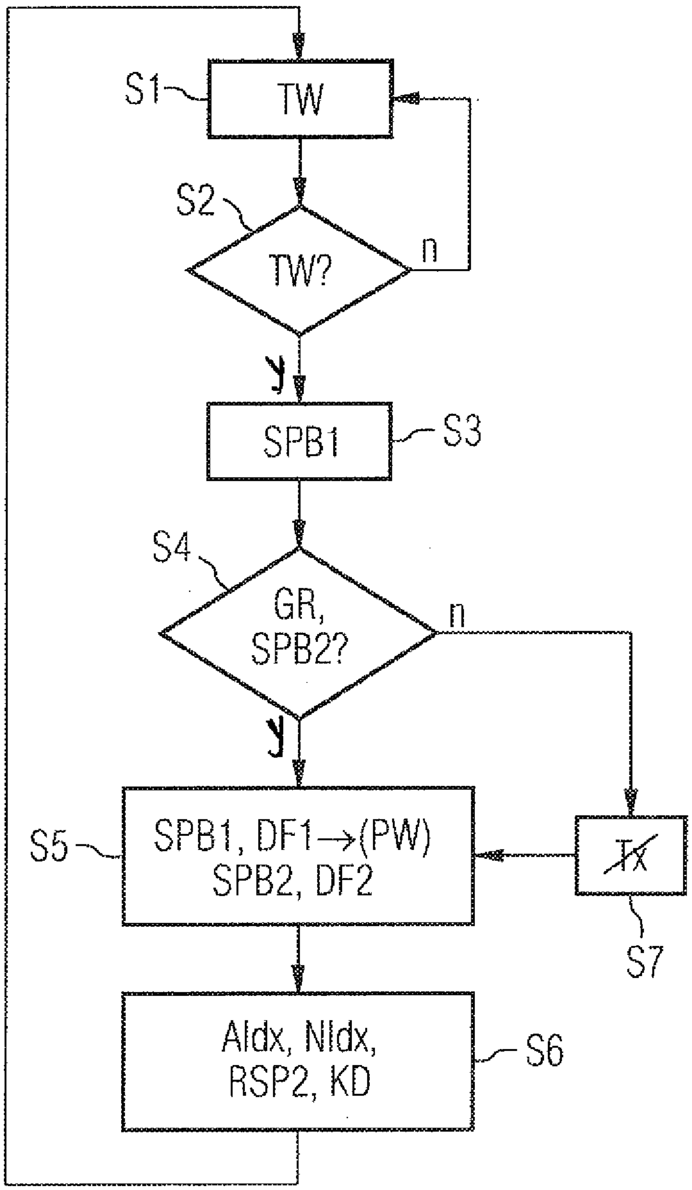
FIG. 4 is a first flowchart.

FIG. 4 is a first flowchart of a first part of a program for operating the tachograph DTCO. This first part of the program relates to conditioning of the acquired data stored in the first memory region SPB1 and the storage of the conditioned data in the predefined second data format DF2 in the second memory region SPB2.

In a step S1, checking for a change of day TW is performed. For example, for this purpose a real time clock of the tachograph DTCO is interrogated or the change of day TW is signaled by the real time clock. When the change of day TW occurs, the date DAT changes and the acquired data, which has been stored in the first memory region SPB1 for the preceding day are completely acquired and are preferably no longer changed. In a step S2 it is checked whether data for the preceding day Tx which are to be conditioned are present and whether the change of day TW has taken place. If this condition is not met, the program is continued in the step S1 and the system waits for the next change of day TW. However, if the conditions in the step S2 are met, the data for the preceding day Tx stored in the first memory region SPB1 and, if appropriate and if necessary also the data for further preceding days Tx, are conditioned according to a predefined conditioning rule. The conditioning of the data according to the predefined conditioning rule comprises, for example, filtering of the data as a function of the currently inserted chip card CK and, in particular, as a function of the chip card CK of that company whose chip card CK is currently inserted or was last inserted in the chipcard-reading unit of the tachograph DTCO.

The conditioning of the data in the step S3 can also include determining at least one check value PW as a function of the acquired data and converting the data stored in the predefined first data format DF1 in the first memory region SPB1 into the predefined second data format DF2. The at least one check value PW is preferably determined as a cryptographic check value PW and particularly preferably as a cryptographic signature. The at least one check value PW is combined with the acquired data within the scope of the predefined second data format DF2, and permits reliable checking of the acquired data for unauthorized manipulation.

In a step S4, the size GR of the data record to be stored is determined and it is checked whether sufficient storage space is available in the second memory region SPB2. If this is the case, in a step S5 the conditioned data are stored in the predefined second data format DF2 in the second memory region SPB2. In a step S6, the oldest index AIdx, the latest index NIdx and the content of the second circular buffer RSP2 or the check data KD are updated insofar as is necessary. The acquired data are available ready to be retrieved in the predefined second data format DF2 in the second memory region SPB2. The program is preferably continued in the step S1, and the system waits for the next change of day TW.

Figure 5:
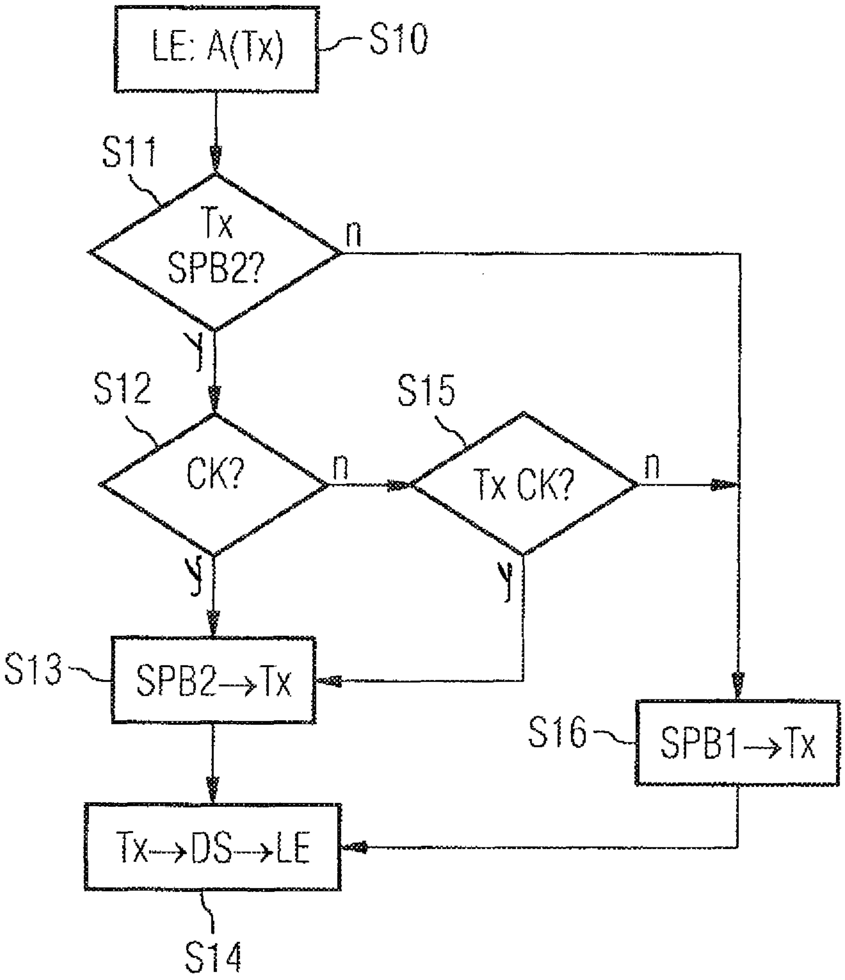
FIG. 5 is a second flowchart.

FIG. 5 shows a second flowchart of a second part of the program for operating the tachograph DTCO. This second part of the program relates to the outputting, as a function of the inquiry A by the reading unit LE, of the data which have been stored in the predefined second data format DF2 in the second memory region SPB2. In a step S10, the reading unit LE makes the inquiry A for the data for the day Tx. The data preferably retrieved on a daily basis and identified by their respective date DAT, that is to say the reading unit LE makes the inquiry A and transmits therein the date DAT of that day Tx whose data are to be output by the tachograph DTCO. It is also possible to provide for the data for a plurality of days Tx to be interrogated by the inquiry A and to correspondingly transmit more than one date DAT or one date range in the inquiry A.

In a step S11 it is checked whether data for the interrogated day Tx is stored in the second memory region SPB2. If this condition is met, in a step S12 it is checked whether the downloading of the data for the interrogated day Tx takes place using the chip card CK of that company whose chip card CK is currently inserted. In this case, the data which have been stored in the second memory region SPB2 are already assigned to that company whose chip card CK is currently inserted. In a step S13, the data stored in the second memory region SPB2 for the interrogated day Tx can then be read, and in a step S14 they can be output to the reading unit LE via the data interface DS of the tachograph DTCO. When the data is output, the predefined second data format DF2 is retained.

However, if it is determined in the step S12 that the downloading takes place, for example, using the chip card CK of a garage or of an inspection body, it is checked in a step S15 whether the data for the interrogated day Tx are stored completely in the second memory region SPB2. This is generally the case if there has been no change of company on the interrogated day Tx, that is to say the chip card CK of the company has not been changed. In this case, in the step S13 the data which have been stored in the second memory region SPB2 for the interrogated day Tx can be read, and in the step S14, output to the reading unit LE.

However, if the interrogated data for the day Tx is not completely stored in the for the day Tx second memory region SPB2, for example because there was a change of company on this day Tx, in a step S16 the data stored in the first memory region SPB1 for the interrogated day Tx is conditioned in accordance with the step S3 of the first part of the program and are output in the step S14 to the reading unit LE in the predefined second data format DF2. Garages and inspection bodies are therefore provided with access to the entirety of the data for the day Tx with their respective chip card CK, while by means of their respective chip card CK companies access only the data which has been acquired and stored using their own chip card CK.

The conditioning of the data which have been stored in the first memory region SPB1 for the interrogated day Tx and the outputting of the data in the predefined second data format DF2 in the steps S16 and S14 is also necessary if the condition in the step S11 is not met, that is to say if the data for the interrogated day Tx is currently not stored in the second memory region SPB2. This ensures that it is possible to access all the data stored in the first memory region SPB1 even if these data are currently not conditioned and stored in the predefined second data format DF2 in the second memory region SPB2. However, the rapid outputting of the data for the interrogated day Tx is possible only if these data are already stored ready to be retrieved in the second memory region SPB2, that is to say the data are already conditioned and stored in the predefined second data format DF2.

The first part and the second part of the program for operating the tachograph DTCO are preferably carried out by the computing unit RE of the tachograph DTCO. The computing unit RE is preferably also designed to determine the at least one check value PW. However, it is also possible to provide a further computing unit which is assigned to the computing unit RE and which is designed to determine the at least one check value PW.

The first part and the second part of the program can be carried out independently of one another. For example, the carrying out of the first part of the program is respectively triggered by the change of day TW, which is signaled, for example, by the real time clock of the tachograph DTCO. The carrying out of the second part of the program is respectively triggered, for example, by the inquiry A by the reading unit LE. The first part of the program preferably runs with low priority.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a tachograph comprising:

conditioning acquired data stored in a first memory region in a predefined first data format according to a predefined conditioning rule;

storing the conditioned data in a second memory region in a predefined second data format, the second data format differing from the first data format;

reading at least a portion of the data stored in the second memory region as a function of an inquiry from a reading unit, the reading unit arranged externally to the tachograph;

outputting the at least a portion of the data stored in the second memory region via a data interface of the tachograph, wherein the predefined second data format of the at least a portion of the data stored in the second memory region is preserved; and updating at least one of an oldest data index indicating an oldest record in the second memory region and a last data index indicating a newest record in the record memory region.

2. The method as claimed in claim 1, wherein conditioning of the acquired data in accordance with the predefined conditioning rule comprises:

determination of at least one cryptographic check value as a function of the acquired data.

3. The method as claimed in claim 2, wherein the at least one cryptographic check value is determined as a signature.

4. The method as claimed in claim 1, further comprising operating the second memory region as a first circular buffer.

5. The tachograph as claimed in claim 1, further configured to:

check for a change of day; and the conditioning of the acquired data and storing of the conditioned data includes conditioning of the acquired data for a respectively preceding day and the storing the conditioned data in the predefined second data format in the second memory region after the change of day has been detected.

* * * * *